United States Patent Office 3,114,607
Patented Dec. 17, 1963

3,114,607
HALOGEN PRODUCTION
Thomas H. Milliken, Rose Valley, Pa., assignor to The M. W. Kellogg Company, Jersey City, N.J., a corporation of Delaware
No Drawing. Filed Sept. 1, 1959, Ser. No. 837,364
9 Claims. (Cl. 23—215)

This invention relates to catalytic reactions involving oxidation. More particularly this invention relates to the oxidation of an inorganic halide for the production of a halogen. In one aspect this invention relates to the continuous oxidation of an inorganic chloride to produce chlorine in a higher yield and in a higher degree of purity than heretofore obtainable.

The present invention is especially advantageous when used for the recovery or the regeneration of chlorine from hydrogen chloride produced as a by-product in various known processes such as the chlorination of organic compounds or pyrolysis or hydrolysis of organic chlorides. For economical operation of these processes, hydrogen chloride must be oxidized to recover chlorine as a gas. One of the best known processes for chlorine recovery is the Deacon process which is represented by the equation:

$$4HCl + O_2 \rightleftharpoons 2Cl_2 + 2H_2O$$

As shown above, reaction is reversible and does not proceed to completion to the right but reaches an equilibrium which varies with the operating conditions. Under optimum conditions, the maximum conversion of the hydrogen chloride to chlorine, obtainable by prior art processes, is about 70 percent. The catalytic procedures illustrated by the Deacon process which employ cuprous chloride as the reaction aid, generally produce chlorine in about 30 percent yield. Because of the low yields of chlorine and the corrosive nature of the chlorine and water product mixture which necessitates using an expensive corrosion resistant liner for the oxidation zone and take-off means, the Deacon process has not met with wide commercial acceptance.

Chlorine may also be produced from an inorganic nitrogen compound such as, for example nitrosyl chloride, by oxidation of the chloride with a suitable oxidizing agent according to the following equation:

$$NOCl + HNO_3 \rightleftharpoons 2NO_2 + \tfrac{1}{2}Cl_2 + H_2O$$

Another method for the production of chlorine involves the conversion of a metal oxide to the corresponding metal chloride with hydrogen chloride and the oxidation of the resulting metal chloride with oxygen to produce chlorine. This is a two-step process which is exemplified by the following equations:

$$2Fe_2O_3 + 12HCl \rightarrow 4FeCl_3 + 6H_2O$$
$$4FeCl_3 + 3O_2 \rightarrow 2Fe_2O_3 + 6Cl_2$$

Although the economics of this process present some advantages over the Deacon process, care must be taken to remove the water formed in the chlorination zone since its presence dilutes the hydrogen chloride and lowers the reactivity of hydrogen chloride to ferric oxide so that incomplete conversion to ferric chloride results.

Therefore, it is an object of the present invention to provide a method for the production of chlorine wherein these disadvantages and others are greatly reduced or entirely eliminated.

Another object of this invention is to provide a commercial and economically feasible method for the production of chlorine from hydrogen chloride.

Another object is to provide a method for the substantially complete conversion of hydrogen chloride to chlorine.

Another object is to provide a continuous process for the preparation of dry chlorine gas from hydrogen chloride.

Still another object of this invention is to provide a hydrogen chloride conversion process for the production of chlorine which avoids the formation of corrosive by-products.

Still another object of this invention is to provide a catalytic composition for the complete conversion of hydrogen chloride to chlorine in a higher yield and in a higher degree of purity.

Yet another object of this invention is to provide a catalytic composition which is suitable for regeneration in a continuous process for the substantially complete conversion of hydrogen chloride to chlorine.

Other objects and advantages of the present invention will become apparent from the following description and disclosure.

According to the present invention a dry halogen gas, preferably chlorine, is produced from an inorganic halide, preferably an inorganic chloride, by reacting the halide with an oxidizing agent in the presence of a catalytic composition comprising a metal oxide or inorganic catalyst of the Deacon type and a clay which is characterized by having at least 0.5 percent reversible water content and retention of crystallinity up to at least 1400° F. The clay is present in an amount of at least 60 percent by weight based on metal of the catalyst.

The reaction is carried out with the solids, namely, the catalyst and the clay, in a fluid or moving bed, preferably with countercurrent introduction of the gaseous and/or liquid materials comprising the oxidizing agent and the inorganic halide. However, the solids may be disposed as fixed beds, in a plurality of reaction zones, with gaseous materials being introduced alternatively to each of said zones and with simultaneous regeneration of the solid material in a zone wherein the introduction of reactants has been discontinued. Thus, the oxidation of the halide is carried out in one zone until it becomes necessary to regenerate the clay, whereupon the oxidation is discontinued and the halide and oxidizing agent are passed to a second zone containing regenerated clay and catalyst while the spent clay or desiccant is regenerated by heating in the first zone or the clay is passed to the second zone for regeneration while the oxidation is continued in the first zone in the presence of the catalyst and regenerated desiccant.

Generally, a moving, or fluid solid is preferred since this mode of operation avoids the occurrance of "hot spots" in the reaction zone and facilitates the continuous removal of spent desiccant and water from the reaction zone for immediate regeneration and recycle.

In any event, the clay, preferably a bentonitic clay, with or without catalyst deposited thereon, is preferably regenerated after absorbing about 1 percent by weight of water; although, the reaction may be safely conducted with the preferred clay up to about 2 percent water absorption or the saturation limit before the clay requires regeneration, if desired.

The above defined clay desiccant absorbs water as soon as it is formed in the reaction zone thereby favorably shifting the equilibrium, and enhancing the yield and purity of the halogen product so that the halogen gas thus produced is suitable for use directly as a halogenating agent or a reagent in chemical reactions, for example, in the halogenation of ethylene or other organic compounds. To illustrate the effect of the desiccant, the following reaction is considered as an example:

$$O_2 + 4HCl \rightleftharpoons 2Cl_2 + 2H_2O$$

When water is continuously being removed from the reaction mixture in the above equation, the equilibrium of the reaction is shifted to the right and this results in the formation of additional quantities of chlorine.

The inorganic halides which undergo oxidation by the process of the present invention include hydrogen chloride, hydrogen bromide, hydrogen iodide, nitrosyl chloride, nitrosyl bromide, nitrosyl iodide, ammonium chloride and ammonium bromide. Of these compounds, the chlorides and bromides are preferred.

The oxidizing agents which are generally employed to produce a halogen product in the process of the present invention include molecular oxygen, air, ozone, nitric acid, oxides of nitrogen, such as nitrogen dioxide and any combinations of the aforementioned oxidizing agents. It is also within the scope of this invention to employ any of the other oxidizing agents which are suitable for releasing halogen in the reactions of the present invention such as, for example a peroxide.

Any of the catalysts conventionally used in the Deacon process or in oxidation process hereinabove discussed including the oxidation of a nitrosyl halide, can be advantageously employed in the present process. Examples of catalysts which are generally used in these processes include; chromium sesquioxide ($Cr_2O_3$), elemental chromium, potassium chromate ($K_2CrO_4$), cerium oxide ($CeO_3$), manganese dioxide ($MnO_2$), uranium trioxide ($UO_3$), cupric chloride ($CuCl_2$), a mixture of ferric oxide and ferric chloride ($Fe_2O_3$-$FeCl_3$), a mixture of chromium sesquioxide and alumina ($Cr_2O_3$-$Al_2O_3$), calcium chloride ($CaCl_2$), silica gel, etc., or any combination thereof. However, chromium sesquioxide is the most preferred catalyst of the present invention, when the oxidation of hydrogen chloride or hydrogen bromide is effected with molecular oxygen.

When copper chloride is employed as a catalyst, it has been found that the addition of a rare earth metal or the salt of an alkali metal, such as potassium chloride, greatly lowers its volatility. Therefore, the combination of this catalyst with these salts or a rare metal is preferable when $CuCl_2$ is the catalyst. When chromium oxide is employed as the catalyst, it is preferred that at least 9 percent by weight based on chromium be deposited on the clay for optimum results in conversion.

The catalyst can be supported on carriers such as, for example silica, alumina, pumice, fuller's earth or any other convenient carrier. However, the catalyst can also be supported on a bentonitic clay which also serves as the selective absorbent or desiccant in the present process. Regardless of which carrier is selected, it is important that the carrier be of sufficient hardness to possess resistance to attrition when the mass of particles is maintained in a fluidized condition.

The oxidation of the inorganic halide is carried out at a temperature of between about 600° F. and about 1000° F. under from about 0 p.s.i.g. to about 160 p.s.i.g. In the oxidation of a hydrogen halide such as hydrogen chloride with oxygen, the reaction is carried out in the presence of a catalyst and the clay desiccant, hereinabove defined, preferably at a temperature of between about 750° F and about 850° F.

While the present process is particularly applicable to the production of chlorine from hydrogen chloride, it is also applicable to the production of other free halogens from the corresponding hydrogen halide. In the later conversions, usually a lower temperature, for example about 75° F. can be empolyed in the production of, for example, iodine, if desired. It is also to be understood, that the present process employing the clay desiccant, can be applied in the oxidation of ammonium chloride in the presence of one of the above-mentioned catalysts, for example, magnesium oxide at a temperature within the above range without departing from the scope of this invention. Still another reaction falling within the scope of this invention, is the oxidation between nitrosyl chloride with nitric acid in the presence of a catalyst. This reaction may also be carried out at a lower temperature within the range of between about 250° F. and about 650° F., if desired. The clay desiccant of the present invention, selectively removes water from the reaction mixture without removing hydrogen chloride. Thus, a distinct advantage of the present process is realized.

While the above oxidation reaction is being carried out, the desiccant absorbs the water produced by the reaction until the clay reaches its saturation limit. When or before the saturation limit is reached, it is necessary to discontinue contacting it with the reactants and to subject the clay to regeneration at a temperature of between about 950° F. and about 1400° F., under from about atmospheric pressure to about 150 p.s.i.g., preferably at between about 1080° F. and about 1200° F., under about atmospheric pressure. The desiccant or absorbent is heated at the desired temperature for a period of from about 10 minutes to about one hour, although a longer heating period may be employed, if desired, since the clay retains its crystallinity at these temperatures even after an extended time. After regeneration, the clay can be cooled to below or about the temperature at which the oxidation is initiated, between about 550° F. and about 900° F., so that it can again serve as the desiccant in the oxidation reaction. This procedure may be repeated at as frequent intervals and as many times as desired, consistent with the limits set forth above.

The absorbent clay employed in the present process serves as a desiccant or an absorbent for the water produced in the reaction zone. To increase the porosity and enhance the absorption properties of this absorbent, it is required that the absorbent be at least partially activated, preferably an acid activated bentonite clay is employed which is produced by leaching or boiling the clay with an acid such as hydrochloric acid or sulfuric acid.

The bentonites which include montmorillonite, beidellite, nontronite, hectorite, saponite and sauconite are unique in their ability to maintain lattice structure at high temperatures in the order of between about 600° F. and about 1400° F. Of these bentonites, montmorillonite has the highest temperature stability and is, therefore, the most preferred desiccant of the present invention. Another unique characteristic of these activated clays is their ability to absorb up to 4 percent by weight of water and their suitability for repeated regeneration at temperatures up to about 1400° F. without loss of crystallinity or absorption capacity. This absorption of water is not merely surface absorption or physisorption, but chemisorption on particular sites of the layer-like crystalline, bentonite lattice. It has now been found that only this particular layer-like structure can be used repeatedly without loss of crystallinity for the selective absorption of water in the processes herein discussed.

Activated alumina fails as an absorbent in these reactions because it is degraded by hydrochloric acid which lowers its surface activity. Silica, on the other hand, is not selective to water but will also absorb some hydrogen chloride and oxygen which produces in a corrosive mixture. It is also true that silica and alumina cannot be used in the present process at the temperatures required in the oxidation and regeneration steps since both silica and alumina involve physisorption which requires substantial partial pressures of water vapor to result in absorption of small amounts of water on the sorbent. Thus, the product gas would contain from 30 percent to 50 percent water vapor at 600° F. At the operating conditions of the present process, silica or alumina could hold, at a maximum, only up to a fraction of the presently described clays; and, therefore, large portions of water, which materially affect the equilibrium of the reaction would remain in the reaction product mixture. Although talc and mica possess a crystalline lattice, activation of these compounds is extremely difficult and their attrition resistance is poor. Glauconite also falls within this category and does not possess the high absorption properties of the bentonites.

An investigation into the structure of bentonites discloses that the lattice is composed of layers of aluminum oxide which are superimposed by layers of silicon oxide. However, at numerous sites in the silicon oxide layers, silicon is substituted with elements including aluminum, iron or other isomorphous substituents, such as, for example magnesium. Acid activation creates a porous structure by removal of alkali ions and destruction of part of the layer-like crystal structure. This provides the porosity necessary in the desiccant of the present process and also allows for the chemisorption, or replacement of water in internal and external surfaces of the crystalline lattice. This ability of bentonites to lose alkali ions is of critical importance and explains the selectivity of this desiccant for water and its ability to be regenerated repeatedly without loss of crystallinity. By the discovery of the present process, it has been found that in the processes discussed above employing bentonite, e.g., monomorillonite, as a desiccant, complete conversion of hydrogen chloride directly to chlorine without the formation of appreciable quantities of extraneous gases present as contaminants is attained. A faster rate of reaction than heretofore possible is achieved and corrosive mixtures are absent from the reaction zone, and the subsequent collection system.

Generally, the oxidation of an inorganic halide to the corresponding halogen gas is carried out at space velocities of between about 50 cc. and about 500 cc. of halide per hour per gram of catalyst, preferably between about 100 cc. and about 400 cc. of halide per hour per gram of catalyst. The clay desiccant of this invention is present in an amount between about 60 percent by weight and about 99.9 percent by weight, preferably between about 80 percent by weight and about 98 percent by weight, per weight of metal in the catalyst.

The weight ratio of the clay to water formed in the system is between about 50:1 and about 120:1, preferably between about 60:1 and about 80:1 or in a stoichiometric ratio with the water produced by the process. The mol ratio of the oxidizing agent to inorganic halide is between about 3:1 and about 1:10, preferably between about 1:1 and about 1:5.

As hereinafter described, the halogen produced as a product of the present process is generated as a gas. The gaseous material is recovered by condensation, retained in a suitable solvent or collected in a gas container. The product is obtainable in a completely dry and pure state. However, in certain instances, it may be desirable to recover a concentrated water solution as a product of the process. When this is the case, the absorbent clay may be used in the oxidation reaction to the stage at which it is completely saturated with water before it is necessary to regenerate it. At the saturation limit some of the halogen gas produced by the reaction will contain water. The concentration of the halogen solution can then be adjusted to meet a particular need.

It is to be understood that the present process can be carried out in batch or continuous operation. Generally, a batch operation is carried out in a steel bomb under at least atmospheric pressure. Continuous operation involves continuous withdrawal of halogen from the system and continuous regeneration of the clay desiccant.

The following examples are offered as a better understanding of the present invention and are not to be construed as unnecessarily limiting thereto.

EXAMPLE 1

Acid activated montmorillonite clay pellets, received from Filtrol Corporation (Filtrol Grade 62, Reference #SV-7220) were impregnated with 2 percent $CuCl_2$ by mixing 100 grams of clay that had been calcined for two hours at 1000° F. with 50 ml. of an aqueous solution of $CuCl_2$ containing 2.0 grams of the salt, drying with stirring and then drying overnight at 210° F. and calcining for two hours at 1000° F.

Chemical analysis of the montmorillonite clay was

| | Weight percent ignited basis |
|---|---|
| $SiO_2$ | 73.1 |
| $Al_2O_3$ | 26.8 |
| $Fe_2O_3$ | 0.07 |
| Cl | 0.03 |
| Ignition loss at 1000 percent | 12.7 |

The copper-containing clay (100 grams) was charged to a one-inch diameter glass reactor. The catalyst and clay were heated by a Hevi-Duty Electric Company furnace at 1100° F. in dry nitrogen flowing at a rate of 800 cc.'s per minute. The catalyst was then cooled in nitrogen to a temperature of 850° F.

Dry oxygen and dry hydrogen chloride in a ratio of about 0.87:1 were passed down through the catalyst bed at 850° F. at a rate of about 11 cc.'s total flow per minute. Infrared analysis was used to determine the hydrogen chloride and chlorine content of the effluent gas and a "cold finger" cell was used to determine the dew point of effluent gas. The results of this experiment are tabulated in Table I.

*Table I*

| Time, minutes | Total Flow, cc./minutes | $O_2$/HCl Ratio | HCl Percent conversion | Dew Point, °C. |
|---|---|---|---|---|
| 0 | 11.0 | | | |
| 61 | 11.0 | | | −46 |
| 77 | 11.0 | 0.87:1 | 96 | −48 |
| 87 | 11.0 | 0.87:1 | 95 | |
| 112 | 11.0 | 0.86:1 | 92 | |

As shown above, the conversion of HCl to chlorine is exceedingly high indicating that the reverse reaction resulting in the reformation of starting materials is negligible.

EXAMPLE 2

After the copper chloride impregnated montmorillonite clay catalyst in Example 1 had absorbed about 1 percent water, it was regenerated in the following manner:

The oxidation reaction in the reactor was halted by discontinuing the introduction of HCl and $O_2$ and the solid catalyst on montmorillonite was then heated to a temperature of about 1200° F. While a stream of nitrogen gas was passed through the catalyst and clay for two hours at a rate of 800 cc./minute to remove moisture absorbed in the clay, the resulting completely regenerated catalyst and clay desiccant was then recontacted with oxygen and hydrogen chloride in the continuance of the oxidation reaction. This regeneration of desiccant can be repeated as often as necessary without any loss of absorption capacity or crystallinity in the clay and without damage to the catalyst.

EXAMPLE 3

Acid activated montmorillonite clay pellets, received from Filtrol Corporation (Filtrol Grade 62, Reference #SV-7220) were impregnated with 10 percent $Cr_2O_3$ by calcining 90 grams of clay (pre-calcined) at 1000° F. and adding the pre-calcined clay with stirring to 13.15 grams of $Cr_2O_3$ dissolved in 50 ml. $H_2O$. The water was evaporated while stirring; and the product was dried overnight at 100° C. and then calcined for two hours at 1000° F.

The chromia-impregnated clay (80 grams) was charged to a reactor. The catalyst and clay were heated in dry nitrogen flowing at a rate of about 800 cc.'s per minute to a temperature of about 1100° F. under atmosphere pressure. The catalyst was then cooled in nitrogen to 850° F.

Dry hydrogen chloride and dry oxygen in a ratio of about 0.71:1 were passed through the catalyst bed at a rate of about 38.5 cc./minute. The reactants were contacted with the catalyst for 24 minutes before the reaction was halted. A high conversion of hydrogen chloride (88.7 percent) was obtained. The composition of the effluent gas, which was determined by infrared analysis was as follows: 42.4 percent chlorine; 10.8 percent hydrogen chloride and 46.8 percent oxygen.

The following examples in Table II illustrate the use of various catalysts in the conversion of HCl to $Cl_2$. In each case the metal or metal oxide catalyst was deposited on and impregnated in Filtrol Grade 62 in a manner similar to those outlined above in Examples 1 and 3. In each instance, the general process described in the above examples was repeated and the various catalysts regenerated after absorbing about 1 percent water.

*Table II*

| Example No. | 4 | 5 | 6 | 7 | 8 | 9 | 10 | 11 | 12 | 13 |
|---|---|---|---|---|---|---|---|---|---|---|
| Amount and Catalyst deposited on Filtrol 62 | 10% Cr | 10% $CuCr_2O_7$ or $CuCl_2$-$Cr_2O_3$ | Same as Ex. 5 | 10% $CuCl_2$ 5.4% KCl | Same as Ex. 7 | Same as Ex. 7 | 10% $K_2CrO_4$ | 20% $Cr_2O_3$, 80% $Al_2O_3$ | Same as Ex. 11 | Same as Ex. 11 |
| Operating Conditions: | | | | | | | | | | |
| Cat. Temp. °F | 850 | 850 | 850 | 850 | 850 | 850 | 850 | 850 | 850 | 850 |
| Pressure, p.s.i.g | 0 | 0 | 0 | 0 | 0 | 0 | 0 | 0 | 0 | 0 |
| Time, minutes | 40 | | 23 | 45 | 13 | 10 | 20 | 5 | 5 | 7 |
| Space Velocity | 174 | 135 | 135 | 143 | 248 | 335.4 | 276 | 900 | 900 | 300 |
| Total Flow cc./minutes | 29 | 45.0 | 45.0 | 47.8 | 82.5 | 111.8 | 92 | 300 | 300 | 100 |
| Catalyst Wgt. grams | 10.0 | 20.0 | 20.0 | 20.0 | 20.0 | 20.0 | 20.0 | 20.0 | 20.0 | 20.0 |
| Desiccant Wgt. grams | 70.0 | 80.0 | 80.0 | 80.0 | 80.0 | 80.0 | 80.0 | 80.0 | 80.0 | 80.0 |
| Ratio $O_2$/HCl | 2.31:1 | 0.483:1 | 0.42:1 | 1.05:1 | 1.26:1 | 1.16:1 | 2.13:1 | 1.46:1 | 1.3:1 | .53:1 |
| Percent Conversion of HCl | 84.1 | 95.0 | 88.5 | 98.6 | 98.9 | 89.0 | 100 | 96.8 | 90.4 | 89.3 |
| Effluent Gas Composition: | | | | | | | | | | |
| Percent $Cl_2$ | 15.7 | 61.4 | 58.5 | 37.6 | 32.5 | 29.8 | 21.9 | 28.0 | 27.9 | 32.4 |
| Percent HCl | 5.95 | 6.7 | 15.25 | 1.1 | 0.7 | 7.4 | 0.0 | 1.9 | 5.9 | 7.8 |
| Percent $O_2$ | 78.35 | 31.9 | 26.25 | 61.3 | 66.8 | 62.8 | 78.1 | 70.1 | 66.2 | 59.8 |

It is to be understood that any of the other inorganic halides mentioned previously in the foregoing description can be substituted for hydrogen chloride in any of the above examples to produce high yields of halogen in a high state of purity. For example, hydrogen bromide may replace hydrogen chloride in any of the above examples to provide high yields of $Br_2$ gas. Nitrosyl chloride may be substituted for hydrogen chloride and nitric acid for oxygen in any of the above examples to provide a process for producing dry chlorine gas in high yield.

By way of further illustration, ammonium chloride may be employed to replace hydrogen chloride and 10 percent cerium oxide or magnesium oxide on Filtrol may be employed as the catalyst in any of the processes heretofore described in Examples 1 to 13 to produce high yields of dry chlorine gas.

Generally, the processes involving the production of iodine from one of the inorganic iodides mentioned above are operated at oxidation temperatures below 850° F., for example, about 600° F. or below. The iodine produced in this way is obtained in a high state of purity.

This invention relates to a process for the preparation of halogen gas in high yield and a high state of purity which comprises oxidizing an inorganic halide, preferably with an inorganic oxygen containing compound, in the presence of at least a molar equivalent of a clay having at least 0.5 percent reversible water content, preferably between 1 percent and 4 percent reversible water content, and a crystalline structure up to at least 1400° F. and preferably an inorganic metal oxide catalyst regenerating the clay, preferably before saturation with water, at a temperature between about 950° F. and about 1400° F. for reuse in the oxidation reaction.

The method of effecting the oxidation reaction and the regeneration reaction may be any of the procedures hereindescribed, and various modifications and alterations of these procedures may become apparent to those skilled in the art without departing from the scope of this invention.

Having thus described my invention, I claim:

1. The process which comprises, reacting an inorganic halide with an inorganic oxidizing agent in the presence of an inorganic metal containing, oxidation catalyst and between about 60 percent and about 99.9 percent of a dissimilar material comprising a bentonite clay as a desiccant, based on the metal of the catalyst, at a temperature of between about 600° F. and about 1000° F., to produce dry halogen gas as a product of the process and withdrawing the desiccant from the reaction mixture before it becomes saturated with water.

2. The process which comprises, reacting an inorganic chloride with an inorganic oxidizing agent in the presence of an inorganic metal containing, oxidation catalyst and between about 80 percent and about 98 percent of a dissimilar material comprising a bentonite clay desiccant, based on the metal of the catalyst, at a temperature of between about 600° F. and about 1000° F. under from about 30 p.s.i.g. to about 160 p.s.i.g. to produce anhydrous chmlorine gas as a product of the process and withdrawing desiccant from the reaction mixture before it becomes saturated with water.

3. The process of claim 2 wherein the bentonite is montmorillonite.

4. The process which comprises, oxidizing an inorganic halide in the presence of an inorganic metal-containing, oxidation catalyst and a dissimilar material as a desiccant comprising a clay having at least 0.5 percent reversible water content and a crystalline structure up to at least 1400° F. to produce anhydrous halogen gas as a product of the process, and regenerating the clay in the absence of reactants at a temperature between about 950° F. and about 1400° F. before the clay becomes saturated with water.

5. The process which comprises, reacting an inorganic halide with an inorganic oxygen containing compound as an oxidizing agent in the presence of an inorganic metal oxide catalyst and between about 60 percent and about 99.9 percent of a dissimilar material comprising a bentonite clay as a desiccant, based on the metal of the catalyst, at a temperature of between about 600° F. and about 1000° F., to produce dry halogen gas, continuing the oxidation until the bentonite absorbs between about 0.5 percent and about 4 percent by weight of water, and then regenerating the bentonite at a temperature between about 1080° F. and about 1400° F. under a pressure from about atmospheric to about 150 p.s.i.g. in the presence of nitrogen gas.

6. The process which comprises reacting hydrogen chloride with oxygen in the presence of chromium sesquioxide as a catalyst and between about 80 percent by weight and about 98 percent by weight of bentonite clay based on the chromium of the catalyst, at a temperature of between about 600° F. and about 1000° F. to produce dry chlorine gas, conducting the oxidation reaction until the bentonite absorbs between about 0.5 percent and about 4 percent by weight of water produced in the process, and then regenerating the bentonite at a temperature between about 1080° F. and about 1400° F. under a pressure of from about atmospheric to about 150 p.s.i.g.

7. In a process for producing chlorine wherein the oxidation of hydrogen chloride is effected in the presence of a metal-containing catalyst the improvement which comprises: introducing into the reaction mixture at least 60 percent by weight, based on the metal of the catalyst, of a dissimilar material as a desiccant comprising a clay having at least 0.5 percent reversible water content and a crystalline structure up to at least 1400° F. to produce anhydrous chlorine as a produce of the process and withdrawing desiccant from the reaction mixture before it becomes saturated with water.

8. In a process for producing chlorine wherein the oxidation of hydrogen chloride is effected in the presence of a metal-containing catalyst the improvement which comprises: introducing into the reaction mixture at least 60 percent by weight, based on the metal of the catalyst, of a dissimilar material as desiccant comprising a clay having at least 0.5 percent reversible water content nad a crystalline structure up to at least 1400° F.; removing said desiccant material from the reaction mixture when the desiccant has absorbed between about 0.5 percent and about 4.0 percent by weight of water and regenerating the desiccant at between about 1080° F. and about 1400° F. for further use in the reaction.

9. The process which comprises reacting an inorganic halide with an oxidizing agent selected from the group consisting of molecular oxygen, ozone, air, nitric acid and an oxide of nitrogen in the presence of an inorganic metal-containing catalyst at least an equal proportion, based on the halide, of a clay desiccant having at least 0.5 percent reversible water content and a crystalline structure up to at least 1400° F. to produce an anhydrous halogen gas as a product of the process and withdrawing desiccant from the reaction mixture before it becomes saturated with water.

References Cited in the file of this patent

UNITED STATES PATENTS

| | | |
|---|---|---|
| 141,333 | Deacon | July 9, 1873 |
| 2,191,981 | De Jahn | Feb. 27, 1940 |
| 2,240,668 | Reed | May 6, 1941 |
| 2,309,919 | Reed | Feb. 2, 1943 |
| 2,395,314 | Blumer | Feb. 19, 1946 |
| 2,892,686 | Greene et al. | June 30, 1959 |
| 2,892,687 | Deahle et al. | June 30, 1959 |

OTHER REFERENCES

Searle's book: "The Chemistry and Physics of Clays and Other Ceramic Materials," second edition, 1933, pages 225 and 257; Ernest Benn Ltd., London, publishers.